United States Patent [19]

Robusto

[11] Patent Number: 4,633,478
[45] Date of Patent: Dec. 30, 1986

[54] HIGH EFFICIENCY RF EXCITED GAS LASER WITH TRANSVERSE DISCHARGE EXCITATION

[75] Inventor: Paul F. Robusto, Carlsbad, Calif.

[73] Assignee: Hughes Aircraft Company, Los Angeles, Calif.

[21] Appl. No.: 745,570

[22] Filed: Jun. 17, 1985

[51] Int. Cl.[4] .............................................. H01S 3/097
[52] U.S. Cl. ....................................... 372/83; 372/82; 372/92
[58] Field of Search ........................ 372/82, 83, 92, 88

[56] References Cited

U.S. PATENT DOCUMENTS 4,240,043  12/1980  Rothe ..................................... 372/83
4,247,829   1/1981  Yagi et al. ............................. 372/83
4,359,777  11/1982  Fox et al. .............................. 372/82
4,493,087   1/1985  Laakman et al. ....................... 372/82

FOREIGN PATENT DOCUMENTS 8501838  4/1985  PCT Int'l Appl. ..................... 372/82

OTHER PUBLICATIONS

Lachambre et al; "A Transversely RF-Excited $CO_2$ Waveguide Caser"; *Applied Physics Letters;* vol. 32, No. 10; 5/78; pp. 652-653.

Primary Examiner—William L. Sikes
Assistant Examiner—Robert E. Wise
Attorney, Agent, or Firm—Joseph E. Szabo; Anthony W. Karambelas

[57] ABSTRACT

A transverse discharge excitation laser is disclosed which includes a dielectric structure (11, 13, 111, 113, 211, 213) for defining an elongated laser excitation cavity (27, 127, 231) suitable for containing a laser gas and maintaining a laser exciting discharge in the laser gas, and further includes opposing conductive electrodes (33, 41, 129, 133, 237, 245) adjacent the laser cavity. The electrodes are sufficiently small to produce a laser exciting discharge within a predetermined region of the laser cavity and to provide optimum efficiency for the desired mode of operation. The electrodes are particularly adjacent opposing walls of the cavity which have a width W, and at least one of the electrodes has a width which is less than the wall width W.

25 Claims, 4 Drawing Figures

HIGH EFFICIENCY RF EXCITED GAS LASER WITH TRANSVERSE DISCHARGE EXCITATION

BACKGROUND OF THE INVENTION

The disclosed invention relates to lasers, and is particularly directed to a high efficiency transverse discharge excitation laser having a narrow electrode structure.

Developments in laser technology have resulted in and the increased utilization of lasers in different fields, including industrial military and medical applications. The increased utilization of lasers has also provided further incentive for the continued development of lasers. As is well known, there are different types of lasers, and the subject invention is directed to gas discharge excitation lasers.

A traditional cavity excited gas laser includes an elongated cavity containing a discharge gas and electrodes at or near the ends of the cavity for providing a longitudinal electric discharge of the gas. The disadvantages of such longitudinal discharge excitation are well known and include the requirement of relatively large DC voltages along with the necessarily large power supply circuitry.

A further development of cavity excited gas lasers is the transverse discharge excitation laser wherein an RF excitation electric field is applied transverse to the longitudinal dimension of the excitation cavity. An example of such transverse discharge excitation laser is set forth in U.S. Pat. No. 4,169,251, issued to Laakmann on Sept. 25, 1979, and assigned to the assignee of the present invention. In the system of U.S. Pat. No. 4,169,251, the electrodes form two opposing walls of the laser cavity.

Characteristics of known transverse excitation lasers include low efficiency, the requirement of high power loading which may result in excessive laser gas temperatures, and limited mode control. As a result of such characteristics, known cavity excitation lasers may be physically large, tend to require large power supplies, and/or may have reduced operating lifetimes. The characteristics of known cavity excitation lasers are important considerations which may make them inappropriate for some applications.

With known transverse excitation lasers, control of operation to the desired lowest order could be achieved by reducing the dimensions of the cross section of an elongated excitation cavity. However, such reduction in cross sectional dimensions requires more complex and expensive manufacturing since the tolerances become more stringent. Also, power output is reduced and limited, and efficiency is reduced.

Another disadvantage of known transverse excitation lasers is that beam size is determined to a large extent by cavity dimensions, which requires substantially different structures for different beam sizes.

SUMMARY OF THE INVENTION

It would therefore be an advantage to provide a high efficiency transverse discharge excitation laser.

It would also be an advantage to provide a transverse discharge excitation laser which efficiently provides desired modes of excitation.

Another advantage would be to provide a transverse discharge excitation laser having an extended operating lifetime.

Still another advantage would be to provide a transverse discharge excitation laser having reduced space and power requirements.

The foregoing and other advantages and features are provided by the invention in a laser structure which includes a dielectric structure for defining an elongated laser excitation cavity suitable for containing a laser gas and maintaining a laser exciting discharge in the laser gas, and further includes opposing conductive electrodes adjacent the laser cavity. At least one of the electrodes is sufficiently small to produce a laser exciting discharge within a predetermined region of the laser cavity and to provide optimum efficiency for the desired mode of operation.

A further embodiment of the laser structure includes grooves which are parallel to and adjacent the laser cavity. The parallel grooves are in communication with the laser cavity and provide for improved performance.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
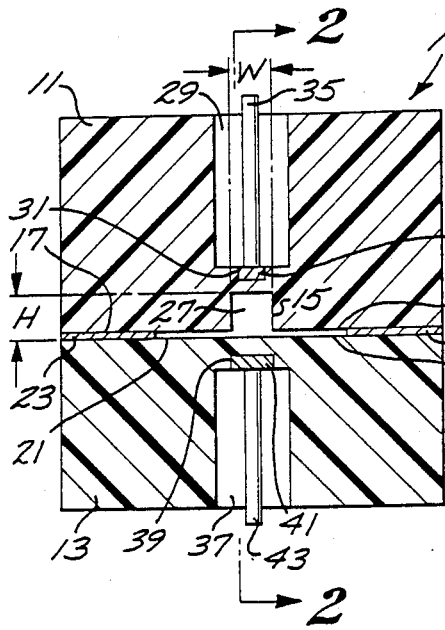
FIG. 1 is a cross-sectional schematic view of the disclosed laser.

In the following detailed description and in the several figures of the drawing, like elements are identified with like reference numerals.

Figure 2:
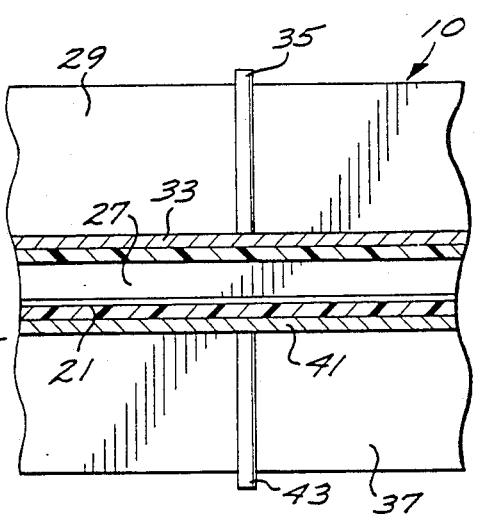
FIG. 2 is a partial longitudinal sectional view of the laser of FIG. 1.

Referring now to FIGS. 1 and 2, shown therein is a laser 10 which includes an elongated top dielectric block 11 and an elongated bottom dielectric block 13.

The top elongated dielectric block 11 includes a centrally located downward facing channel 15 between substantially flat bottom surfaces 17, 19. The bottom elongated dielectric block 13 includes a substantially flat top surface 21 which is secured to the outer portions of the bottom surfaces 17, 19 of the dielectric block 11 by brazed metal regions 23, 25. Alternatively, the top elongated dielectric block 11 and the bottom elongated dielectric block 13 may be secured to each other by an appropriate adhesive or by a mechanical clamping structure.

The gap formed between the bottom surfaces 17, 19 of the dielectric block 11 and the top surface 22 of the dielectric block 13 is relatively small in comparison to the dimensions of the downward facing channel 15. Thus, the channel 15 cooperates with the top surface 21 to form an elongated laser excitation cavity 27 having opposing top and bottom walls and opposing side walls, and which is substantially rectangular in cross-section.

The top dielectric block 11 further includes a centrally located upwardly facing channel 29. A groove 31 is formed in the bottom of the channel 29 adjacent the top wall of the laser cavity 27, and contains a plated exciter electrode 33. The exciter electrode 33 is coupled to a source of RF energy (not shown) via appropriate feeds, one of which is shown as a pin 35 which is conductively coupled to the exciter electrode 33 and extends upwardly beyond the channel 29. The exciter electrode 33 extends for a large portion of the longitudinal dimension of the laser cavity 27.

Although disclosed as a plated electrode, the exciter electrode 33 may be of a different structure, such as a bulk electrode which extends up through the channel 29, and is appropriately secured in place. Also, the channel 29 may be formed without the groove 31, and an appropriate exciter electrode would be plated or butted against the flat bottom of the channel 29.

The bottom dielectric block 13 further includes a downwardly facing channel 37. A groove 39 is formed in the top of the channel 37 adjacent the bottom wall of the laser cavity 27, and contains a plated ground electrode 41. The electrode 41 is coupled to ground via appropriate connections, such as a downwardly extending pin 43 shown in FIGS. 1 and 2. The ground electrode 41 extends for a large portion of the longitudinal dimension of the laser cavity 27.

Although disclosed as a plated electrode, the ground electrode 41 may be of a different structure, such as a bulk electrode which extends down through the channel 37, and is appropriately secured in place. Also, the channel 37 may be formed without the groove 39, and an appropriate ground electrode would be plated or butted against the flat top of the channel 37.

While the electrode 33 has been described as the exciter electrode and the electrode 41 has been decribed as the ground electrode, their functions may readily be interchanged, with appropriate changes to provide proper feed. Also, the electrode 33, 41 may be readily configured to provide a split feed whereby neither electrode is connected to ground. Split feed circuits are well known and may be utilized as required.

As another embodiment, the lower dielectric block 13, the ground electrode 41, and the pin 43 may be replaced with an elongated metallic block. The metallic block would cooperate with the top elongated dielectric block 11 to define the laser excitation cavity and would also function as the ground electrode.

In use, the laser cavity 27 is filled with a desired laser gas. For example, for a $CO_2$ laser the laser gas may be a mixture of He, $N_2$ and $CO_2$.

The electrodes 33, 41 are preferably dielectrically separated from the laser cavity, as shown, so that they do not come into contact with the laser gas. Such dielectrically separated electrodes are external to the laser cavity 27 and are therefore referred to herein as external electrodes. Dielectric separation of the electrodes 33, 41 from the laser cavity 27 avoids possible electrode sputtering and also prevents oxidation which tends to change the laser gas composition.

However, the electrodes 33, 41 may also be utilized to define part of the laser cavity 27, or they may be plated or metallized to opposing walls of the laser cavity 27. Such electrodes are internal electrodes which would come into contact with the laser gas. While internal electrodes may be subject to electrode sputtering, their use may be desired in order to achieve a lower starting voltage, or to achieve a polarized laser output.

The dielectric blocks 11, 13 are constructed of an appropriate ceramic material which does not react with or affect the laser gas. For example, for a $CO_2$ laser, $Al_2O_3$ or BeO would be appropriate. The electrodes 33, 41 and the pins 35, 43 are made of a suitable conductive material such as copper or aluminum.

By way of example, for a $CO_2$ laser the length or longitudinal dimension of the laser cavity 27 may be about 24 inches. The width W of the top and bottom walls of the cavity may be about 100 mils and the height H of the side walls of the cavity may be about 100 mils. The gap between the top dielectric block 11 and the bottom dielectric block 13 would be about 4 mils.

Each of the electrodes 33, 41 may have a different width, but at least one electrode width in the proximity of the laser cavity 27 is less than the width W of the cavity 27. For example, the electrode width may be from about 95 percent to about 25 percent of the width W. More generally stated, the laser cavity has a cross section, as shown in FIG. 1, which is perpendicular to the longitudinal dimension of the laser cavity 27. The electrode dimension of interest is that dimension which is perpendicular to the longitudinal dimension of the laser cavity 27 and which is generally parallel to a cross sectional dimension of the laser cavity 27. Such electrode dimension of interest is measured at the portion of the electrode in the proximity of the laser cavity 27.

Another way of considering the size of the electrodes 33, 41 relative to the laser cavity 27 is with reference to the lateral dimensions of the electrodes 33, 41 which are perpendicular to the longitudinal dimension of the laser cavity 27 and are adjacent the laser cavity 27. Such lateral dimension for at least one of the electrodes 33, 41 is less than the largest dimension of the laser cavity 27 which is parallel to such electrode lateral dimension. While in the foregoing discussion the lateral dimension corresponds to what is referred to as width, it should be readily understood that such lateral dimension may correspond to other references, such as height which is discussed in the subsequent embodiment.

The electrode structure discussed above and further disclosed herein, where at least one of the electrodes is narrower than a corresponding cavity dimension, shall be referred to as the narrow electrode structure. Such reference is based on the important feature that at least one of the laser excitation electrodes is narrower than the laser excitation cavity.

Preferably, the width of at least one of the electrodes 11, 13 is about 60 to 70 percent of the width W of the cavity 27. As a result of the narrower electrode structure, higher output efficiency is achieved for the lowest order excitation mode $EH_{11}$ which propagates into a nearly $TEM_{00}$ gaussian mode outside the laser 10. For example, efficiencies of about 16 percent have been achieved which is a substantial improvement over known transverse discharge lasers which have efficiencies of about 10 or 11 percent.

Such efficiency is believed to result at least in part from the confinement of the RF energy to the central region of the cavity 27 where the energy of the lowest order mode $EH_{11}$ is generated. In known lasers, RF energy is uniformly distributed across the laser excitation cavity, but energy in the lowest order mode is only in the central region of the cavity. Thus, to the extent only energy in the lowest order mode is extracted, energy outside the central region of the cavity is lost since it is not coupled out of the laser. Further, the narrow electrode structure of the invention tends to generate energy of the lowest order mode.

The narrow structure of at least one of the electrodes 33, 41 further allows for determining beam size as a function of the width of the electrodes 33, 41. For example, reducing the widths of both electrodes by 50 percent reduces the laser output beam diameter by about 50 percent.

With the narrow electrode structure, a further desired mode of excitation may be achieved. Application of sufficiently high RF energy to overheat the laser gas in the center of the mode provides the $EH_{22}$ mode within the laser cavity, which propagates in the $TEM_{11}$ mode in free space.

Figure 3:
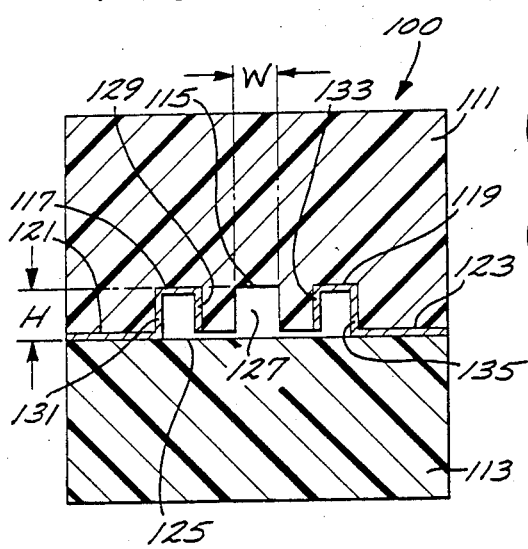
FIG. 3 is a cross-sectional view of another embodiment of the disclosed laser.

Referring now to FIG. 3 shown therein is a further embodiment of a narrow electrode traverse excitation laser 100 of the invention. The laser 100 includes an elongated top dielectric block 111 and an elongated bottom dielectric block 113.

The top elongated dielectric block 111 includes a centrally located downward facing channel 115, and downward facing channels 117 and 119 on either side of the channel 115. The top dielectric block 111 further includes flat bottom surfaces 121, 123 extending outwardly from the channels 117, 119.

The bottom elongated dielectric block 113 includes a planar top surface 125 which is secured to the bottom surfaces 121, 123 of the top dielectric block 111 by brazing, by an appropriate adhesive, or by a mechanical clamping structure.

The gaps between the top surface 125 of the bottom dielectric block 113 and the lower most regions of the top dielectric block 111 adjacent the centrally located channel 115 are relatively small in comparison to the dimensions of the channel 115. Thus, the top surface 125 of the bottom dielectric block 113 and the centrally located channel 115 form an elongated laser cavity 127 having opposing top and bottom walls and opposing side walls, and which is substantially rectangular in cross-section.

An exciter electrode 129 is metallized on the wall of the channel 117 adjacent a side wall of the laser cavity 127, and extends for a large portion of the longitudinal dimension of the laser cavity 127. The exciter electrode 129 is conductively coupled to the perimeter of the laser 100 by appropriate metallization 131 which is on the top and outer walls of the channel 117 and extends outwardly between the top dielectric block bottom surface 131 and the bottom dielectric top surface 125. Such conductively coupling metallization is appropriately positioned to provide proper feed to the exciter electrode 129.

A ground electrode 133 is metallized on the wall of the channel 119 adjacent a side wall of the laser cavity 129, and extends for a large portion of the longitudinal dimension of the laser cavity 127. The ground electrode 133 is conductively coupled to the perimeter of the laser 100 by appropriate metallization 135 which is on the top and outer walls of the channel 117 and extends outwardly between the top dielectric block bottom surface 131 and the bottom dielectric top surface 125. Such conductively coupling metallization is appropriately positioned to provide proper coupling of the ground electrode 133 to ground.

Conductive coupling to the electrodes 129, 133 may be provided by structures other than by the portions of the metallizations 131, 135 which extend outwardly between the top elongated dielectric block 111 and the bottom elongated dielectric block 113. Particularly, appropriate conductive pins may be positioned between the top and bottom dielectric blocks 111, 113, or may be secured within the top dielectric block 111. Such pins would be conductively connected to the portions of the metallizations 131, 135 in the channels 117, 119, or would be conductively connected to the conductors 129, 133.

Although the electrode 129 has been described as the exciter electrode and the electrode 133 has been described as the ground electrode, their functions may readily be interchanged, with appropriate changes, if necessary, to the respective conductively coupling metallizations 131, 135. Also, the electrodes 129, 133 may be readily configured to provide a split feed whereby neither electrode is connected to ground. Split feed circuits are well known and may be utilized as required.

The laser 100 shown in FIG. 3 is similar to the laser 10 shown in FIGS. 1 and 2, and the most notable difference is the positioning of the electrodes 129 and 133 in the laser 100. By analogy to the laser 10 previously described, the height of the electrodes 129, 133 is less than the height H of the laser cavity 127. Specifically, the height of the electrodes 129, 133 is of the same relation to the height H of the laser cavity 129 as the relation between the width of the electrodes 31, 41 and the width W of the laser cavity 27 of the laser 10.

The narrow electrode structure of the laser 100 shown in FIG. 3 provides advantages substantially similar to those described above for the laser 10 of FIGS. 1 and 2. Such advantages include substantially increased efficiency, improved mode control, beam size control, and longer operating lifetime. The laser 100 has the further advantages of lower operating temperatures, and increased structural strength since the channels 29, 37 of the laser 10 (FIG. 1) are not utilized in the laser 100.

Figure 4:
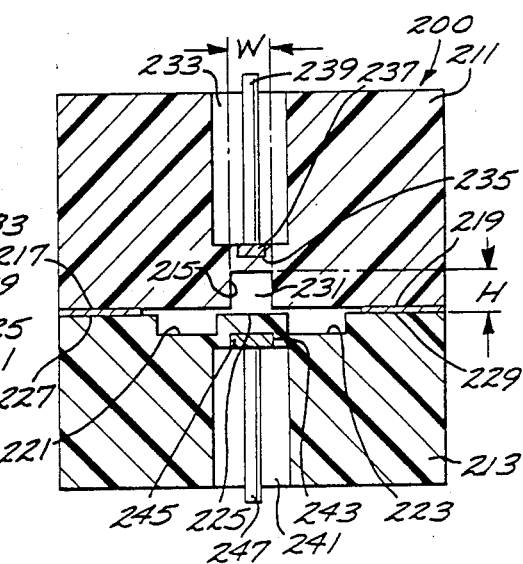
FIG. 4 is a cross-sectional view of a further embodiment of the disclosed laser.

Referring now to FIG. 4, shown therein is a further embodiment of a narrow electrode transverse excitation laser 200 of the invention. The laser 200 includes an elongated top dielectric block 211 and an elongated bottom dielectric block 213.

The top elongated dielectric block 211 includes a centrally located downward facing channel 215 between substantially flat bottom surfaces 217, 219. The bottom elongated dielectric block 213 includes two upward facing elongated grooves 221, 223 on either side of a central top surface 225 and parallel to the downward facing channel 215. The bottom dielectric block 213 further includes substantially planar top surfaces 227, 229 on either side of the grooves 221, 223. The planar top surfaces 225, 227 of the bottom dielectric block 213 are secured to the outer portions of the bottom surfaces 217, 219 of the dielectric block 211 by brazing, by an appropriate adhesive, or by a mechanical clamping structure.

The gaps formed between the bottom surfaces 217, 219 of the dielectric block 211 and the central top surface 225 of the bottom dielectric block 213 are relatively small in comparison to the dimensions of the downward facing channel 215. Thus, the channel 215 cooperates with the central top surface 225 to form an elongated laser excitation cavity 231 having opposing top and bottom walls and opposing side walls, and which is substantially rectangular. The grooves 221, 223 are parallel to the laser cavity 231 and are in communication therewith.

The top dielectric block 211 further includes a centrally located upwardly facing channel 233. A groove 235 is formed in the bottom of the channel 233 adjacent the top wall of the laser cavity 231, and contains a plated exciter electrode 237. The exciter electrode 237 is coupled to a source of RF energy (not shown) via appropriate feeds, one of which is shown as a pin 239 which is conductively coupled to the exciter electrode 237 and extends beyond the channel 233. The exciter electrode 237 extends for a substantial portion along the longitudinal dimension of the laser cavity 231.

Although disclosed as a plated electrode, the exciter electrode 237 may be of a different structure, such as a bulk electrode which extends up through the channel 233, and is appropriately secured in place. Also, the channel 233 may be formed without the groove 235, and an appropriate exciter electrode would be plated or butted against the flat bottom of the channel 233.

The bottom dielectric block 213 further includes a downwardly facing channel 241. A groove 243 is formed in the top of the channel 241 adjacent the bottom wall of the laser cavity 231, and contains a plated ground electrode 245. The ground electrode 245 is coupled to ground via appropriate connections, such as the pin 247 shown in FIG. 4. The ground electrode 245 extends a substantial portion along the longitudinal direction of the laser cavity 231.

Although disclosed as a plated electrode, the ground electrode 245 may be of a different structure, such as a bulk electrode which extends down through the channel 241, and is appropriately secured in place. Also, the channel 241 may be formed without the groove 243, and an appropriate ground electrode would be plated or butted against the flat top of the channel 241.

As another embodiment, the lower dielectric block 213, the ground electrode 245 and the pin 247 may be replaced with an elongated metallic block. The metallic block would cooperate with the top elongated dielectric block 211 to define the laser excitation cavity and would also function as the ground electrode.

The foregoing described laser 200 of FIG. 4 has an electrode and cavity structure similar to that of the laser 10 of FIGS. 1 and 2; and the electrode width and cavity width relation for the laser 200 is substantially similar to that for the laser 10 of FIGS. 1 and 2. The advantages provided by the laser 200 are also substantially similar to that provided by the laser 10.

However, the laser 200 of FIG. 4 provides improved performance as a result of the grooves 221, 223 which reduce the capacitance of the structure, thereby further reducing stray electric fields outside the laser cavity 231. Additionally, the grooves 221, 223 function as reservoirs for cooler laser gas, which allows the laser 200 to operate more efficiently. The grooves 221, 223 further allow the laser gas to achieve chemical equalibrium more rapidly, and may also improve modulation performance.

The foregoing embodiments of the invention are directed to elongated laser cavities which are substantially rectangular in cross-section. However, the invention may also be embodied with cavities having other cross-section shapes, such as circular. For a circular laser cavity, the electrode width would be less than the diameter of the cavity cross-section. Specifically, at least one of the electrodes would be sufficiently narrow to provide optimum efficiency for the desired mode of operation.

As a further advantage of the disclosed laser structure, two parallel laser beams can be generated with the same laser cavity. As previously described, a narrow electrode structure with the application of sufficiently high RF power generates excitation in the $EH_{21}$ mode. Also, since the electrode dimensions define the excitation region, two pairs of opposing electrodes may be utilized in a single laser cavity to generate two beams.

The foregoing has been a disclosure of a transverse discharge excitation laser having narrow electrodes and provides improved efficiency, lower operating temperatures, and increased operating lifetime time. Further, the disclosed narrow electrode laser allows for improved mode control.

Although the foregoing has been a description and illustration of specific embodiments of the invention, various modifications and changes thereto can be made by persons skilled in the art without departing from the scope and spirit of the invention as defined by the following claims.

What is claimed is:

1. A laser structure comprising:
   means for defining an elongated laser cavity suitable for containing a laser gas and maintaining a laser exciting discharge in the laser gas, said laser cavity having a longitudinal dimension and a cross section perpendicular to said longitudinal dimension; and
   a pair of opposing electrodes disposed in the proximity of and extending along said laser cavity longitudinal dimension for providing a laser excitation field within said cavity and respectively having an electrode dimension that is generally parallel to a corresponding cross sectional dimension of said laser cavity, said electrode dimension of at least one of said opposing electrodes being less than said laser cavity cross sectional dimension, said electrodes producing a laser exciting discharge within a predetermined region of said laser cavity and providing for laser energy with optimum efficiency.

2. The laser structure of claim 1 wherein said laser cavity includes opposing walls having a width W, and wherein said opposing electrodes are adjacent said opposing walls with at least one of said opposing electrodes having a width which is less than the wall width W.

3. The laser structure of claim 2 wherein said at least one electrode has a width between about 95 percent and about 25 percent of said width w.

4. The laser structure of claim 1 wherein said laser cavity includes opposing walls having a height H and wherein said opposing electrodes are adjacent said opposing walls with at least one electrode having a height which is less than the wall height H.

5. The laser structure of claim 4 wherein said said at least one electrode has a height between about 95 percent and about 25 percent of said height H.

6. The laser structure of claim 1 wherein said opposing electrodes are dielectrically separated from said laser cavity.

7. The laser structure of claim 1 wherein said opposing electrodes are contiguous to said laser cavity.

8. The laser structure of claim 1 wherein said opposing electrodes comprise plated electrodes.

9. The laser structure of claim 1 wherein said opposing electrodes comprise bulk electrodes.

10. The laser structure of claim 1 wherein said opposing electrodes comprise metallized electrodes.

11. The laser structure of claim 1 further including means adjacent said laser cavity for providing a reservoir of cooler laser gas.

12. The laser structure of claim 11 wherein said reservoir providing means comprises grooves parallel to and in communication with said laser cavity.

13. A laser structure comprising:
   a means for defining an elongated laser cavity suitable for containing a laser gas and maintaining a laser exciting discharge in the laser gas, said laser cavity having a longitudinal dimension and a cross section perpendicular to said longitudinal dimension; and a pair of opposing electrodes disposed in the proximity of and extending along said laser cavity longitudinal dimension for providing a laser excitation field within said cavity and respectively having a lateral dimension that is generally parallel to a corresponding cross sectional dimension of said laser cavity, said electrode lateral dimension of at least one of said opposing electrodes being less than said laser cavity cross sectional dimension, said electrodes producing a laser exciting discharge with reduced energy losses at the cavity walls and providing for laser energy with optimum efficiency.

14. The laser structure of claim 13 wherein said at least one electrode is narrower than said laser cavity.

15. The laser structure of claim 14 wherein said laser cavity cross section is rectangular.

16. A laser structure comprising:
dielectric means having an elongated channel;
first electrode means cooperating with said dielectric means for defining an elongated laser cavity suitable for containing a laser gas and maintaining a laser exciting discharge in the laser gas, said laser cavity having a longitudinal dimension and a cross section perpendicular to said longitudinal dimension; and
second electrode means disposed opposite said first electrode means in the proximity of and extending along said laser cavity longitudinal dimension and having an electrode dimension generally parallel to and less than a corresponding cross sectional dimension of said laser cavity, said second electrode means cooperating with said first electrode means to provide a laser excitation field within said cavity for producing a laser exciting discharge with reduced energy losses at the cavity walls and for providing laser energy with optimum efficiency.

17. The laser structure of claim 16 wherein said laser cavity includes opposing walls having a width W and being respectively formed by said channel in said dielectric means and by said first electrode means, and wherein said second electrode means is adjacent the opposing wall formed by said channel and has a width which is less than the wall width W.

18. The laser structure of claim 17 wherein said second electrode means has a width between about 95 percent and about 25 percent of said wall width W.

19. The laser structure of claim 16 wherein said second electrode means is dielectrically separated from said laser cavity.

20. The laser structure of claim 16 wherein said second electrode means is contiguous to said laser cavity.

21. The laser structure of claim 16 wherein said second electrode means comprises a plated electrode.

22. The laser structure of claim 16 wherein said second electrode means comprises a bulk electrode.

23. The laser structure of claim 16 wherein said second electrode means comprises a metallized electrode.

24. The laser structure of claim 16 further including means adjacent said laser cavity for providing a reservoir of cooler laser gas.

25. The laser structure of claim 24 wherein said reservoir providing means comprises grooves parallel to and in communication with said laser cavity.

* * * * *